(12) United States Patent
Pang et al.

(10) Patent No.: US 11,343,104 B2
(45) Date of Patent: May 24, 2022

(54) METHOD FOR ESTABLISHING SECURED CONNECTION, AND RELATED DEVICE

(71) Applicant: HUAWEI TECHNOLOGIES CO., LTD., Guangdong (CN)

(72) Inventors: Gaokun Pang, Shenzhen (CN); Ping Fang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 142 days.

(21) Appl. No.: 15/751,864

(22) PCT Filed: Aug. 24, 2015

(86) PCT No.: PCT/CN2015/087967
§ 371 (c)(1),
(2) Date: Feb. 11, 2018

(87) PCT Pub. No.: WO2017/031674
PCT Pub. Date: Mar. 2, 2017

(65) Prior Publication Data
US 2018/0241570 A1    Aug. 23, 2018

(51) Int. Cl.
*G06F 21/00*  (2013.01)
*H04L 9/32*  (2006.01)
(Continued)

(52) U.S. Cl.
CPC .............. *H04L 9/3247* (2013.01); *H04L 9/08* (2013.01); *H04L 9/0825* (2013.01);
(Continued)

(58) Field of Classification Search
CPC ... H04L 9/3247; H04L 9/0866; H04L 9/3249; H04L 9/3252; H04L 9/3255;
(Continued)

(56) References Cited

U.S. PATENT DOCUMENTS 5,659,616 A * 8/1997 Sudia .................. G06Q 20/341
705/76
6,671,805 B1 * 12/2003 Brown ................. H04L 9/3247
713/170
(Continued)

FOREIGN PATENT DOCUMENTS

CN    101319582 A    12/2008
CN    101378315 A    3/2009
(Continued)

OTHER PUBLICATIONS

IEEE Std 802.11-2012,Part 11:Wireless LAN Medium Access Control(MAC) and Physical Layer(PHY) Specifications, IEEE Computer Society,dated Mar. 29, 2012,total 2793 pages.
(Continued)

*Primary Examiner* — Jeffrey C Pwu
*Assistant Examiner* — Helai Salehi
(74) *Attorney, Agent, or Firm* — Fish & Richardson P.C.

(57) ABSTRACT

The present invention provides a security authentication method, a configuration method, and a related device. A first terminal receives a public key for signature of a configuration device sent by the configuration device. The first terminal receives second signature information and second type information. The first terminal determines, according to at least the second type information and the second signature information, that the first terminal is to generate key information. In this way, the first terminal establishes a security connection between the first terminal and the second terminal. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

20 Claims, 10 Drawing Sheets

(51) Int. Cl.
*H04L 9/08* (2006.01)
*H04W 12/041* (2021.01)
*H04W 12/062* (2021.01)

(52) U.S. Cl.
CPC ............. *H04L 9/0866* (2013.01); *H04L 9/32* (2013.01); *H04L 9/3236* (2013.01); *H04W 12/041* (2021.01); *H04W 12/062* (2021.01)

(58) Field of Classification Search
CPC ........... H04L 9/3257; H04L 2012/5682; G06F 21/16; G06F 21/64; G06F 2221/0733; G11B 20/00289; G11B 20/00884; H04N 21/8358; H04N 2005/91335
See application file for complete search history.

(56) References Cited

U.S. PATENT DOCUMENTS

| | | | |
|---|---|---|---|
| 2002/0056050 A1 | 5/2002 | Heiden et al. | |
| 2005/0074126 A1 | 4/2005 | Stanko | |
| 2007/0220591 A1* | 9/2007 | Damodaran | H04L 9/0643 726/4 |
| 2009/0022325 A1* | 1/2009 | Naedele | H04L 63/0442 380/282 |
| 2011/0113481 A1 | 5/2011 | Panasyuk et al. | |
| 2012/0328101 A1 | 12/2012 | Lakshminarayanan | |
| 2015/0195686 A1* | 7/2015 | Yu | H04W 4/08 370/338 |
| 2015/0229475 A1 | 8/2015 | Benoit et al. | |
| 2015/0270969 A1 | 9/2015 | Ishizaka et al. | |
| 2015/0365238 A1* | 12/2015 | Hui | H04L 9/3297 713/178 |
| 2016/0191501 A1 | 6/2016 | Li et al. | |
| 2016/0242030 A1 | 8/2016 | Pang et al. | |
| 2016/0269176 A1 | 9/2016 | Pang et al. | |

FOREIGN PATENT DOCUMENTS

| | | |
|---|---|---|
| CN | 101401387 A | 4/2009 |
| CN | 101772024 A | 7/2010 |
| CN | 102065126 A | 5/2011 |
| CN | 102215274 A | 10/2011 |
| CN | 102612820 A | 7/2012 |
| CN | 102857492 A | 1/2013 |
| CN | 103532975 A | 1/2014 |
| CN | 103580872 A | 2/2014 |
| CN | 103781522 A | 5/2014 |
| CN | 104539701 A | 4/2015 |
| CN | 104756126 A | 7/2015 |
| JP | 2005516533 A | 6/2005 |
| JP | 2008211329 A | 9/2008 |
| JP | 2011004317 A | 1/2011 |
| JP | 2013511209 A | 3/2013 |
| WO | 2007035655 A2 | 3/2007 |
| WO | 2014011027 A1 | 1/2014 |
| WO | 2014068632 A1 | 5/2014 |
| WO | 2015014307 A1 | 2/2015 |
| WO | 2015061941 A1 | 5/2015 |
| WO | 2015061992 A1 | 5/2015 |
| WO | 2015120373 A1 | 8/2015 |

OTHER PUBLICATIONS

Wi-Fi Simple Configuration Technical Specification Version 2.0.2, Wi-Fi Alliance, dated Jan. 30, 2012, total 154 pages.

Office Action issued in Chinese Application No. 202010206792.3 dated Mar. 17, 2021, 6 pages.

Yang et al., "An Identity-based Signature Scheme with Public Key Recovery," 2010 International Conference on Educational and Network Technology, Jun. 2010, 4 pages.

Qadir et al., "A study of CGA—(Cryptographically Generated Address) Signature based authentication of Binding Update messages in low-end MIPv6 node," International Conference on Computer and Communication Engineering (ICCCE 2012), Kuala Lumpur, Malaysia, Jul. 3-5, 2012, 5 pages.

Jin-Guo et al., "Secure Anonymous Authentication Scheme Based on Elliptic Curve and Zero-Knowledge Proof in VANET," Journal on Communications, 2013, Issue 5, 2 pages (English abstract).

Office Action issued in Chinese Application No. 202010206792.3 dated Oct. 11, 2021, 6 pages.

* cited by examiner

METHOD FOR ESTABLISHING SECURED CONNECTION, AND RELATED DEVICE

CROSS-REFERENCE TO RELATED APPLICATIONS

This application is a National Stage of International Application No. PCT/CN2015/087967, filed on Aug. 24, 2015, which is hereby incorporated by reference in its entirety.

TECHNICAL FIELD

The present invention relates to the network communications field, and in particular, to a security authentication method, a configuration method, and a related device.

BACKGROUND

In the prior art, a configuration device is capable of configuring a to-be-configured first terminal, so that the to-be-configured first terminal can receive encrypted configuration information sent by the configuration device. If the first terminal that receives the configuration information expects to establish a security connection to a second terminal, the first terminal forwards the configuration information to the second terminal. The second terminal is capable of verifying the configuration information. If the verification succeeds, the first terminal can establish a security connection to the second terminal. For example, in a wireless local area network (WLAN), the first terminal may be an access point (AP), and the second terminal may be a station (STA). The AP is capable of sending the STA the configuration information sent by the configuration device to the STA, and the STA verifies the configuration information. If the verification succeeds, the STA can access the AP. For another example, in a peer-to-peer (P2P) network, the first terminal may be a group owner (GO) device, and the GO device may be used as a central node of the P2P network. The second terminal may be a P2P device. The GO device is capable of sending the configuration information sent by the configuration device to the P2P device. The P2P device verifies the configuration information, and if the verification succeeds, the P2P device can access the GO device.

However, a defect in the prior art is as follows: For example, in a wireless local area network, if an attacker terminal receives the configuration information sent by the configuration device, the attacker terminal can change its own role, so that the attacker terminal can disguise as the AP device. The attacker terminal sets its own information to a service set identifier (SSID) of the AP. When a STA attempts to connect to the AP, the attacker terminal sends the configuration information received from the configuration device to the STA. The STA performs verification according to the configuration information, and the verification can succeed. The STA cannot recognize the attacker terminal as a fraudulent AP. After the attacker terminal establishes a connection to the STA, the attacker terminal can intercept information of the STA. It can be learnt that, in the prior art, there is a security risk in establishing a connection between terminals.

SUMMARY

The present invention provides a security authentication method, a configuration method, and a related device.

A first aspect of embodiments of the present invention provides a security authentication method, including:

receiving, by a first terminal, a public key for signature of a configuration device sent by the configuration device;

receiving, by the first terminal, second signature information and second type information, where the second signature information is signature information sent by the configuration device to a second terminal, the second signature information is generated by the configuration device according to at least the second type information and a private key for signature of the configuration device, the second type information is role type information of the second terminal and/or type information of a role that the second terminal can connect to, and the public key for signature of the configuration device corresponds to the private key for signature of the configuration device; and determining, by the first terminal according to at least the second type information and the second signature information, that the first terminal is to generate key information, where the key information is used for the first terminal to establish a security connection to the second terminal.

With reference to the first aspect of the embodiments of the present invention, in a first implementation manner of the first aspect of the embodiments of the present invention, the method further includes:

receiving, by the first terminal, first signature information sent by the configuration device, where the first signature information is generated by the configuration device according to at least the first type information and the private key for signature, and the first type information is role type information of the first terminal and/or type information of a role that the first terminal can connect to.

With reference to the first implementation manner of the first aspect of the embodiments of the present invention, in a second implementation manner of the first aspect of the embodiments of the present invention, the role type information of the first terminal and/or the type information of the role that the first terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to any one of the first aspect of the embodiments of the present invention to the second implementation manner of the first aspect of the embodiments of the present invention, in a third implementation manner of the first aspect of the embodiments of the present invention, the role type information of the second terminal and/or the type information of the role that the second terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to the third implementation manner of the first aspect of the embodiments of the present invention, in a fourth implementation manner of the first aspect of the embodiments of the present invention, With reference to any one of the first aspect of the embodiments of the present invention to the third implementation manner of the first aspect of the embodiments of the present invention, in a fourth implementation manner of the first aspect of the embodiments of the present invention, the determining, by the first terminal according to at least the second type information and the second signature information, that the first terminal is to generate key information includes:

when the first terminal determines that the first type information matches the second type information and that the second signature information matches the second type information, determining, by the first terminal, to generate the key information.

With reference to the fourth implementation manner of the first aspect of the embodiments of the present invention, in a fifth implementation manner of the first aspect of the embodiments of the present invention, after the determining, by the first terminal according to at least the second type information and the second signature information, that the first terminal is to generate key information, the method includes:

generating, by the first terminal, the key information.

A second aspect of the embodiments of the present invention provides a configuration method, including:

obtaining, by a configuration device, type information of a terminal, where the type information is role type information of the terminal and/or type information of a role that the terminal can connect to;

generating, by the configuration device, signature information according to at least the type information and a private key for signature of the configuration device; and sending, by the configuration device, the signature information and a public key for signature of the configuration device to the terminal, where the public key for signature of the configuration device corresponds to the private key for signature of the configuration device.

With reference to the second aspect of the embodiments of the present invention, in a first implementation manner of the second aspect of the embodiments of the present invention, the obtaining, by a configuration device, type information of a terminal includes:

receiving, by the configuration device, an indication message sent by the terminal, where the indication message contains the type information.

With reference to the second aspect of the embodiments of the present invention, in a second implementation manner of the second aspect of the embodiments of the present invention, the obtaining, by a configuration device, type information of a terminal includes:

receiving, by the configuration device, a discovery message sent by the terminal; and determining, by the configuration device, the type information according to the discovery message, where the discovery message corresponds to the type information.

With reference to the second aspect of the embodiments of the present invention, in a third implementation manner of the second aspect of the embodiments of the present invention, the obtaining, by a configuration device, type information of a terminal includes:

receiving, by the configuration device, an operation instruction inputted by a user, where the operation instruction is used to indicate the type information.

With reference to the second aspect of the embodiments of the present invention, in a fourth implementation manner of the second aspect of the embodiments of the present invention, the obtaining, by a configuration device, type information of a terminal includes:

scanning, by the configuration device, a quick response code that is of the terminal and that contains the type information; or establishing, by the configuration device, a near field communication (NFC) connection to the terminal to obtain the type information.

With reference to any one of the second aspect of the embodiments of the present invention to the fourth implementation manner of the second aspect of the embodiments of the present invention, in a fifth implementation manner of the second aspect of the embodiments of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

With reference to any one of the second aspect of the embodiments of the present invention to the fifth implementation manner of the second aspect of the embodiments of the present invention, in a sixth implementation manner of the second aspect of the embodiments of the present invention, the signature information further includes a first hash value, and the first hash value is a hash value generated by the configuration device by performing a hash operation on at least the type information.

A third aspect of the embodiments of the present invention provides a configuration method, including:

transferring, by a terminal, type information of the terminal to a configuration device, where the type information is role type information of the terminal and/or type information of a role that the terminal can connect to; and receiving, by the terminal, signature information and a public key for signature of the configuration device that are sent by the configuration device, where the signature information is generated by the configuration device according to at least the type information and a private key for signature of the configuration device, and the public key for signature of the configuration device corresponds to the private key for signature of the configuration device.

With reference to the third aspect of the embodiments of the present invention, in a first implementation manner of the third aspect of the embodiments of the present invention, the transferring, by a terminal, type information to a configuration device includes:

generating, by the terminal, an indication message, where the indication message contains the type information; and sending, by the terminal, the indication message to the configuration device.

With reference to the third aspect of the embodiments of the present invention, in a second implementation manner of the third aspect of the embodiments of the present invention, the transferring, by a terminal, type information to a configuration device includes:

generating, by the terminal, a discovery message; and sending, by the terminal, the discovery message to the configuration device, where the discovery message corresponds to the type information.

With reference to the third aspect of the embodiments of the present invention, in a third implementation manner of the third aspect of the embodiments of the present invention, the transferring, by a terminal, type information to a configuration device includes:

generating, by the terminal, a quick response code, where the quick response code contains the type information; or establishing, by the terminal, a near field communication (NFC) connection to the configuration device; and sending, by the terminal, the type information to the configuration device by using the NFC.

With reference to the method according to any one of the third aspect of the embodiments of the present invention to the third implementation manner of the third aspect of the embodiments of the present invention, in a fourth implementation manner of the third aspect of the embodiments of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

A fourth aspect of the embodiments of the present invention provides a first terminal, including:

a first receiving unit, configured to receive a public key for signature of a configuration device sent by the configuration device;

a second receiving unit, configured to receive second signature information and second type information, where the second signature information is signature information sent by the configuration device to a second terminal, the second signature information is generated by the configuration device according to at least the second type information and a private key for signature of the configuration device, the second type information is role type information of the second terminal and/or type information of a role that the second terminal can connect to, and the public key for signature of the configuration device corresponds to the private key for signature of the configuration device; and a first determining unit, configured to determine, according to at least the second type information and the second signature information, that key information is to be generated, where the key information is used for the first terminal to establish a security connection to the second terminal.

With reference to the fourth aspect of the embodiments of the present invention, in a first implementation manner of the fourth aspect of the embodiments of the present invention, the first terminal further includes:

a third receiving unit, configured to receive first signature information sent by the configuration device, where the first signature information is generated by the configuration device according to at least the first type information and the private key for signature, and the first type information is role type information of the first terminal and/or type information of a role that the first terminal can connect to.

With reference to the first implementation manner of the fourth aspect of the embodiments of the present invention, in a second implementation manner of the fourth aspect of the embodiments of the present invention, the role type information of the first terminal and/or the type information of the role that the first terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to the second implementation manner of the fourth aspect of the embodiments of the present invention, in a third implementation manner of the fourth aspect of the embodiments of the present invention, the role type information of the second terminal and/or the type information of the role that the second terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to the third implementation manner of the fourth aspect of the embodiments of the present invention, in a fourth implementation manner of the fourth aspect of the embodiments of the present invention, the first determining unit is further configured to, when it is determined that the first type information matches the second type information and the first terminal determines that the second signature information matches the second type information, determine that the first terminal is to generate the key information.

With reference to the fourth implementation manner of the fourth aspect of the embodiments of the present invention, in a fifth implementation manner of the fourth aspect of the embodiments of the present invention, the first terminal further includes:

a first generation unit, configured to generate the key information.

With reference to the fifth implementation manner of the fourth aspect of the embodiments of the present invention, in a sixth implementation manner of the fourth aspect of the embodiments of the present invention, the first terminal further includes:

a first sending unit, configured to send the first signature information to the second terminal.

A fifth aspect of the embodiments of the present invention provides a configuration device, including:

a fourth receiving unit, configured to obtain type information of the terminal, where the type information is role type information of the terminal and/or type information of a role that the terminal can connect to;

a second generation unit, configured to generate signature information according to at least the type information and a private key for signature of the configuration device; and a second sending unit, configured to send the signature information and a public key for signature of the configuration device to the terminal, where the public key for signature of the configuration device corresponds to the private key for signature of the configuration device.

With reference to the fifth aspect of the embodiments of the present invention, in a first implementation manner of the fifth aspect of the embodiments of the present invention, the fourth receiving unit is further configured to receive an indication message sent by the terminal, and the indication message contains the type information.

With reference to the fifth aspect of the embodiments of the present invention, in a second implementation manner of the fifth aspect of the embodiments of the present invention, the fourth receiving unit includes:

a receiving module, configured to receive a discovery message sent by the terminal; and a determining module, configured to determine the type information according to the discovery message, where the discovery message corresponds to the type information.

With reference to the fifth aspect of the embodiments of the present invention, in a third implementation manner of the fifth aspect of the embodiments of the present invention, the fourth receiving unit is further configured to receive an operation instruction inputted by a user, and the operation instruction is used to indicate the type information.

With reference to the fifth aspect of the embodiments of the present invention, in a fourth implementation manner of the fifth aspect of the embodiments of the present invention, the fourth receiving unit is further configured to scan a quick response code that is of the terminal and that contains the type information; or the fourth receiving unit is further configured to establish a near field communication (NFC) connection to the terminal to obtain the type information.

With reference to any one of the fifth aspect of the embodiments of the present invention to the fourth implementation manner of the fifth aspect of the embodiments of the present invention, in a fifth implementation manner of the fifth aspect of the embodiments of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

With reference to any one of the fifth aspect of the embodiments of the present invention to the fifth implementation manner of the fifth aspect of the embodiments of the present invention, in a sixth implementation manner of the fifth aspect of the embodiments of the present invention, the signature information further includes a first hash value, and the first hash value is a hash value generated by the configuration device by performing a hash operation on at least the type information.

A sixth aspect of the embodiments of the present invention provides a terminal, including:

a third sending unit, configured to transfer type information of the terminal to a configuration device, where the type information is role type information of the terminal and/or type information of a role that the terminal can connect to; and a fifth receiving unit, configured to receive signature information and a public key for signature of the configuration device that are sent by the configuration device, where the signature information is generated by the configuration device according to at least the type information and a private key for signature of the configuration device, and the public key for signature of the configuration device corresponds to the private key for signature of the configuration device.

With reference to the sixth aspect of the embodiments of the present invention, in a first implementation manner of the sixth aspect of the embodiments of the present invention, the third sending unit includes:

a first generation module, configured to generate an indication message, where the indication message contains the type information; and a second sending module, configured to send the indication message to the configuration device.

With reference to the sixth aspect of the embodiments of the present invention, in a second implementation manner of the sixth aspect of the embodiments of the present invention, the third sending unit includes:

a second generation module, configured to generate a discovery message; and a third sending module, configured to send the discovery message to the configuration device, where the discovery message corresponds to the type information.

With reference to the sixth aspect of the embodiments of the present invention, in a third implementation manner of the sixth aspect of the embodiments of the present invention, the third sending unit includes:

a third generation module, configured to generate a quick response code, where the quick response code contains the type information; or the third sending unit includes:

an establishment module, configured to establish a near field communication (NFC) connection to the configuration device; and a fourth sending module, configured to send the type information to the configuration device by using the NFC.

With reference to any one of the sixth aspect of the embodiments of the present invention to the third implementation manner of the sixth aspect of the embodiments of the present invention, in a fourth implementation manner of the sixth aspect of the embodiments of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

A seventh aspect of the embodiments of the present invention provides a first terminal, including a receiver, a transmitter, and a processor, where the processor is connected to the receiver and the transmitter separately;

the receiver is configured to receive a public key for signature of a configuration device sent by the configuration device;

the receiver is configured to receive second signature information and second type information, where the second signature information is signature information sent by the configuration device to a second terminal, the second signature information is generated by the configuration device according to at least the second type information and a private key for signature of the configuration device, the second type information is role type information of the second terminal and/or type information of a role that the second terminal can connect to, and the public key for signature of the configuration device corresponds to the private key for signature of the configuration device; and the processor is configured to determine, according to at least the second type information and the second signature information, that the first terminal is to generate key information, where the key information is used for the first terminal to establish a security connection to the second terminal.

With reference to the seventh aspect of the embodiments of the present invention, in a first implementation manner of the seventh aspect of the embodiments of the present invention, the receiver is configured to receive first signature information sent by the configuration device, where the first signature information is generated by the configuration device according to at least the first type information and the private key for signature, and the first type information is role type information of the first terminal and/or type information of a role that the first terminal can connect to.

With reference to the first implementation manner of the seventh aspect of the embodiments of the present invention, in a second implementation manner of the seventh aspect of the embodiments of the present invention, the role type information of the first terminal and/or the type information of the role that the first terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to the second implementation manner of the seventh aspect of the embodiments of the present invention, in a third implementation manner of the seventh aspect of the embodiments of the present invention, the role type information of the second terminal and/or the type information of the role that the second terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

With reference to the third implementation manner of the seventh aspect of the embodiments of the present invention, in a fourth implementation manner of the seventh aspect of the embodiments of the present invention, the processor is configured to, when it is determined that the first type information matches the second type information and the first terminal determines that the second signature information matches the second type information, determine to generate the key information.

With reference to the fourth implementation manner of the seventh aspect of the embodiments of the present invention, in a fifth implementation manner of the seventh aspect of the embodiments of the present invention, the processor is configured to generate the key information.

With reference to the fifth implementation manner of the seventh aspect of the embodiments of the present invention, in a sixth implementation manner of the seventh aspect of the embodiments of the present invention, the transmitter is configured to send the first signature information to the second terminal.

An eighth aspect of the present invention provides a configuration device, including a transmitter, a receiver, and a processor, where the processor is connected to the transmitter and the receiver separately;

the receiver is configured to obtain type information of the terminal, where the type information is role type information of the terminal and/or type information of a role that the terminal can connect to;

the processor is configured to generate signature information according to at least the type information and a private key for signature of the configuration device; and the transmitter is configured to send the signature information and a public key for signature of the configuration device to the terminal, where the public key for signature of the configuration device corresponds to the private key for signature of the configuration device.

With reference to the eighth aspect of the present invention, in a first implementation manner of the eighth aspect of the present invention, the receiver is configured to receive an indication message sent by the terminal, where the indication message contains the type information.

With reference to the eighth aspect of the present invention, in a second implementation manner of the eighth aspect of the present invention, the receiver is configured to receive a discovery message sent by the terminal; and the processor is configured to determine the type information according to the discovery message, where the discovery message corresponds to the type information.

With reference to the eighth aspect of the present invention, in a third implementation manner of the eighth aspect of the present invention, the receiver is configured to receive an operation instruction inputted by a user, where the operation instruction is used to indicate the type information.

With reference to the eighth aspect of the present invention, in a fourth implementation manner of the eighth aspect of the present invention, the receiver is configured to scan a quick response code that is of the terminal and that contains the type information; or the receiver is configured to establish a near field communication (NFC) connection to the terminal to obtain the type information.

With reference to the configuration device according to any one of the eighth aspect of the present invention to the fourth implementation manner of the eighth aspect of the present invention, in a fifth implementation manner of the eighth aspect of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

With reference to the configuration device according to any one of the eighth aspect of the present invention to the fifth implementation manner of the eighth aspect of the present invention, in a sixth implementation manner of the eighth aspect of the present invention, the signature information further includes a first hash value, and the first hash value is a hash value generated by the configuration device by performing a hash operation on at least the type information.

A ninth aspect of the present invention provides a terminal, including a transmitter, a receiver, and a processor, where the processor is connected to the transmitter and the receiver separately;

the transmitter is configured to transfer type information of the terminal to a configuration device, where the type information is role type information of the terminal and/or type information of a role that the terminal can connect to; and the receiver is configured to receive signature information and a public key for signature of the configuration device that are sent by the configuration device, where the signature information is generated by the configuration device according to at least the type information and a private key for signature of the configuration device, and the public key for signature of the configuration device corresponds to the private key for signature of the configuration device.

With reference to the ninth aspect of the present invention, in a first implementation manner of the ninth aspect of the present invention, the processor is configured to generate an indication message, where the indication message contains the type information; and the transmitter is configured to send the indication message to the configuration device.

With reference to the ninth aspect of the present invention, in a second implementation manner of the ninth aspect of the present invention, the processor is configured to generate a discovery message; and the transmitter is configured to send the discovery message to the configuration device, where the discovery message corresponds to the type information.

With reference to the ninth aspect of the present invention, in a third implementation manner of the ninth aspect of the present invention, the processor is configured to generate a quick response code, where the quick response code contains the type information; or the processor is configured to establish a near field communication (NFC) connection to the configuration device; and the transmitter is configured to send the type information to the configuration device by using the NFC.

With reference to the terminal according to any one of the ninth aspect of the present invention to the third implementation manner of the ninth aspect of the present invention, in a fourth implementation manner of the ninth aspect of the present invention, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

According to the security authentication method, the configuration method, and the related device that are provided in the embodiments, in a process of establishing a security connection between a first terminal and a second terminal, the first terminal not only needs to perform verification according to information that is used to establish the connection and included in second signature information, but also needs to verify type information of the second terminal. The first terminal establishes the security connection between the first terminal and the second terminal only when the verification succeeds. This effectively prevents an attacker terminal from tampering with its role, and therefore effectively prevents a terminal from establishing a connection to the attacker terminal with a changed role, thereby further preventing the attacker terminal from obtaining information of the terminal, to effectively ensure security of the terminal.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Ordinal numbers mentioned in the embodiments of the present invention, such as "first" and "second", are used only for differentiation, unless they do express ordinal meanings as are understood from the context.

Figure 1:
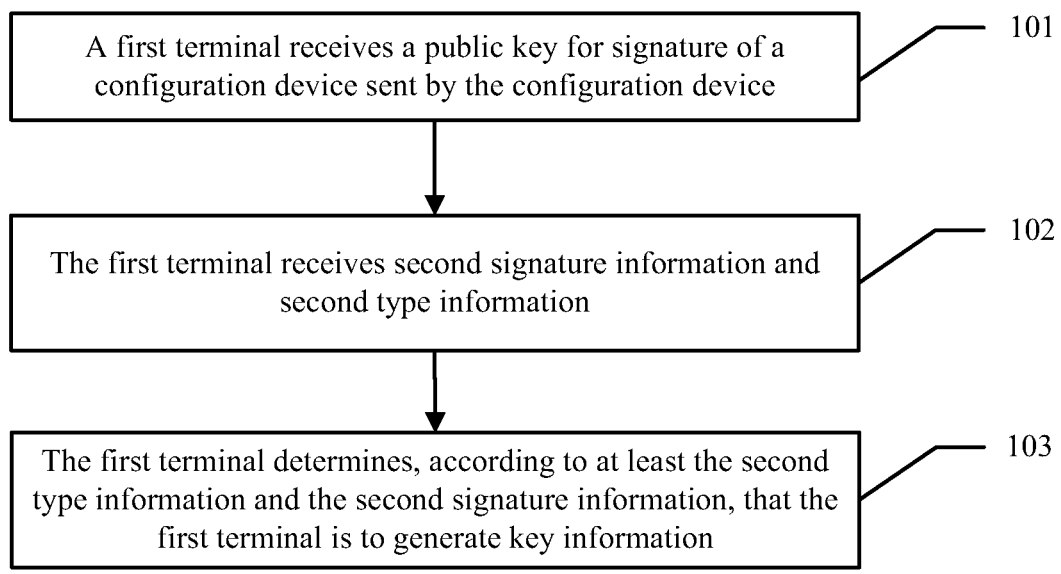
FIG. 1 is a flowchart of steps in a security authentication method according to an embodiment of the present invention.

FIG. 1 is a flowchart of steps in a security authentication method according to an embodiment of the present invention. The following describes in detail, according to FIG. 1, the security authentication method provided in this embodiment of the present invention. The security authentication method provided in this embodiment of the present invention includes the following steps.

101: A first terminal receives a public key for signature of a configuration device sent by the configuration device.

The configuration device is a device that configures the terminal so that the configured terminal can establish a security connection to another terminal.

102: The first terminal receives second signature information and second type information.

The second type information is role type information of a second terminal and/or type information of a role that the second terminal can connect to.

That is, the second type information may be the role type information of the second terminal, or the second type information may be the role type information of the second terminal and the type information of the role that the second terminal can connect to, or the second type information may be the type information of the role that the second terminal can connect to.

The second type information is sent by the second terminal to the first terminal.

The second signature information is signature information sent by the configuration device to the second terminal, and the second signature information is generated by the configuration device according to at least the second type information and a private key for signature of the configuration device.

Specifically, the configuration device can perform a hash operation on the second type information, and uses the private key for signature to encrypt a hash operation result so as to form the second signature information.

The public key for signature of the configuration device corresponds to the private key for signature of the configuration device.

The first terminal can use the public key for signature of the configuration device to decrypt the second signature information that is encrypted by using private key for signature.

103: The first terminal determines, according to at least the second type information and the second signature information, that the first terminal is to generate key information.

The key information is used for the first terminal to establish a security connection to the second terminal.

How specifically the first terminal determines the key information according to the second type information and the second signature information is not limited in this embodiment, provided that the first terminal can establish a security connection between the first terminal and the second terminal after determining the role type information of the second terminal and/or the type information of the role that the second terminal can connect to.

The first terminal may determine, according to a preset condition, whether verification on a connection between the first terminal and the second terminal succeeds. The preset condition includes the second type information and the second signature information. The preset condition may further include: configurator information, for example, a network identifier (network ID) and a peer key.

When determining that the information sent by the second terminal meets the preset condition, the first terminal determines that a connection request of the second terminal is authenticated, and the first terminal generates the key information to indicate that the first terminal can establish a security connection to the second terminal.

Specifically, the key information used to establish a security connection between the first terminal and the second terminal is a prior art, and how specifically the first terminal establishes a security connection between the first terminal and the second terminal by using the key information is also a prior art. Details are not described in this embodiment.

In this embodiment, in a process that a first terminal establishes a security connection to a second terminal, the first terminal not only needs to perform verification according to information that is used to establish the connection and included in second signature information, but also needs to verify type information of the second terminal. The first terminal establishes the security connection between the first terminal and the second terminal only when the verification succeeds. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 2:
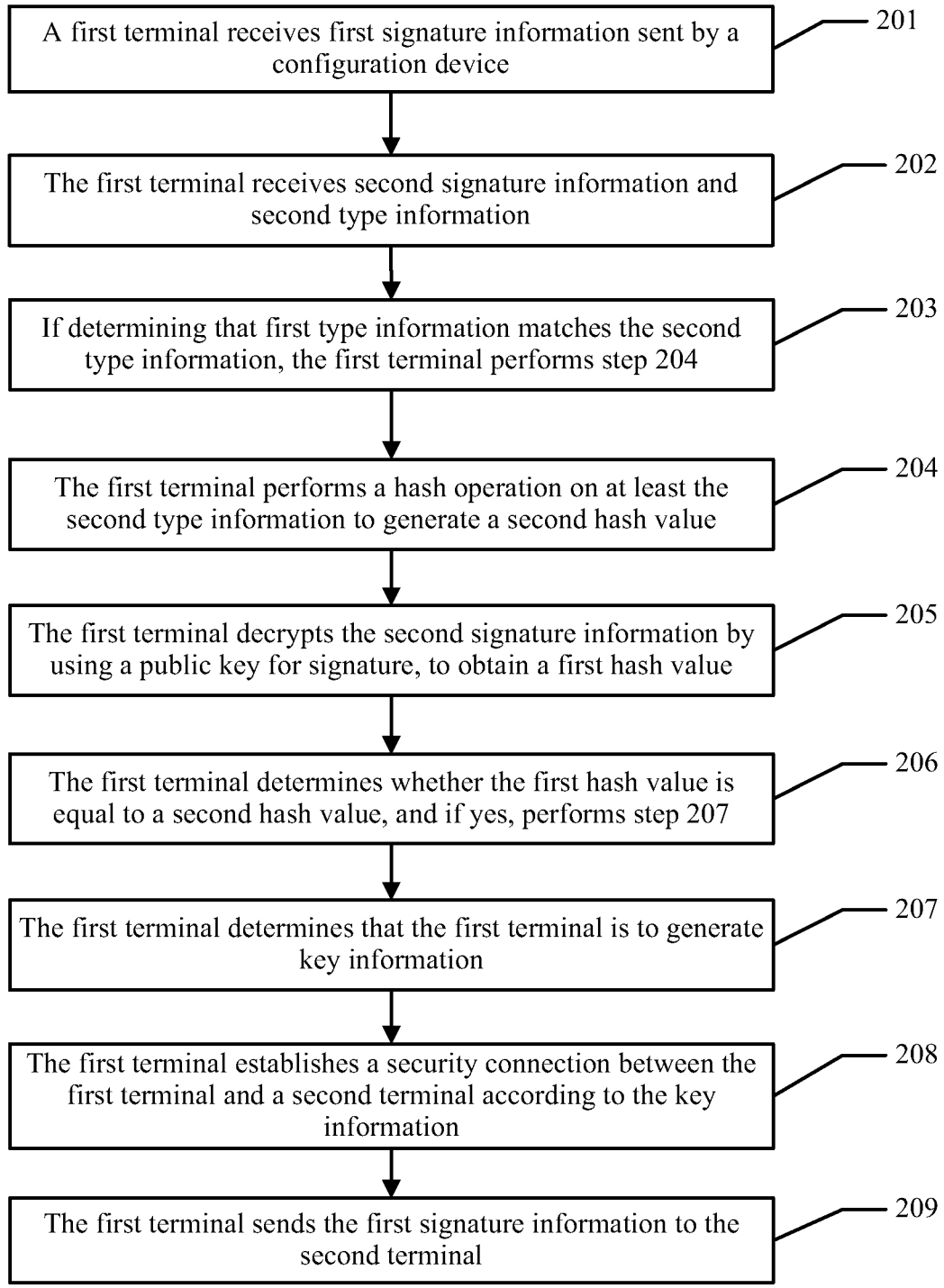
FIG. 2 is another flowchart of steps in a security authentication method according to an embodiment of the present invention.

FIG. 2 is another flowchart of steps in a security authentication method according to an embodiment of the present invention, and is used to describe how specifically a first terminal performs security authentication on a second terminal so as to establish a security connection between the first terminal and the second terminal.

201: The first terminal receives first signature information and a public key for signature of a configuration device that are sent by the configuration device.

The first signature information is generated by the configuration device according to at least first type information and a private key for signature of the configuration device.

The first type information is role type information of the first terminal and/or type information of a role that the first terminal can connect to.

Specifically, the role type information of the first terminal and/or the type information of the role that the first terminal can connect to may be any of the following type information:

a station (STA), an access point (AP), a point-to-point group owner device (P2P GO), a point-to-point client device (P2P client), a anchor master, a non-anchor master, a repeater, a dock center device, a dockee device, a peripheral, a source device source, a sink device sink, a service set identifier (SSID), a Media Access Control (MAC) address, an enrollee, and the like.

It should be clear that the foregoing is merely an example description of the role type information of the first terminal.

Specifically, in this embodiment, the role type information of the first terminal and the type information of the role that the first terminal can connect to are type information of two mutually corresponding roles, and a connection can be established between two terminals of mutually corresponding roles.

It should be noted that the type information of the two mutually corresponding roles may be: a STA corresponds to an AP, a P2P GO corresponds to a P2P client, a master corresponds to a non-master, a STA corresponds to a repeater, or an AP corresponds to a repeater.

For example, if the role type information of the first terminal is an AP, the type information of the role that the first terminal can connect to is a STA. Conversely, if the type information of the role that the first terminal can connect to is an AP, the role type information of the first terminal is a STA.

If the role type information of the first terminal is a repeater, the type information of the role that the first terminal can connect to may be a STA, or may be an AP.

Further, if the role type information of the first terminal is a capability supported by the first terminal, the type information of the role that the first terminal can connect to is correspondingly also the capability supported by the first terminal.

For example, if the role type information of the first terminal is a device supporting P2P, the type information of the role that the first terminal can connect to is a device supporting P2P.

The role type information of the first terminal is a device supporting a neighbor awareness network (NAN), and the type information of the role that the first terminal can connect to is a device supporting the neighbor awareness network (NAN). If the role type information of the first terminal is a device supporting a specific base station subsystem (BSS), the type information of the role that the first terminal can connect to is a device supporting the base station subsystem (BSS).

More specifically, if the role type information of the first terminal is information about a specific service supported by the first terminal, the type information of the role that the first terminal can connect to is correspondingly also the information about the specific service supported by the first terminal.

202: The first terminal receives second signature information and second type information.

The second signature information is generated by the configuration device according to at least the second type information and the private key for signature of the configuration device, and is sent by the configuration device to the second terminal. In addition, the public key for signature of the configuration device corresponds to the private key for signature of the configuration device.

The first terminal further receives a public key of the second terminal sent by the second terminal, so as to generate key information.

Specifically, when the second terminal needs to establish a connection to the first terminal, the second terminal sends the second signature information and the second type information to the first terminal.

The second type information is role type information of the second terminal and/or type information of a role that the second terminal can connect to.

Specifically, the role type information of the second terminal and/or the type information of the role that the second terminal can connect to may be any of the following type information:

a station (STA), an access point (AP), a point-to-point group owner device (P2P GO), a point-to-point client device (P2P client), an anchor master, a non-anchor master, a repeater, a dock center device, a dockee device, a peripheral, a source device, a sink device, a service set identifier (SSID), a Media Access Control (MAC) address, an enrollee, and the like.

It should be clear that the foregoing is merely an example description of the role type information of the second terminal.

Refer to step 201 for specific details about the role type information of the second terminal and/or the type information of the role that the second terminal can connect to. The details about the role type information of the second terminal and/or the type information of the role that the second terminal can connect to are not described herein again.

203: If determining that first type information matches the second type information and that the second signature information matches the second type information, the first terminal determines to generate key information.

Specifically, if the first terminal determines that the second type information is the type information of the role that the second terminal can connect to, and that the first type information is the type information of the role that the first terminal can connect to, and if the type information of the role that the second terminal can connect to matches the type information of the role that the first terminal can connect to, it indicates that the first terminal matches the second terminal.

For example, if the type information of the role that the second terminal can connect to is a STA, and the type information of the role that the first terminal can connect to is an AP, it indicates that the first terminal matches the second terminal.

Specifically, if the first terminal determines that the second type information is the role type information of the second terminal, and that the first type information is the role type information of the first terminal, and if the role type information of the second terminal matches the role type information of the first terminal, it indicates that the first terminal matches the second terminal.

For example, if the first terminal determines that the role type information of the second terminal is an AP, and that the role type information of the first terminal is a STA, it indicates that the first terminal matches the second terminal.

Specifically, if the first terminal determines that the second type information is the type information of the role that the second terminal can connect to, and that the first type information is the role type information of the first terminal, and if the type information of the role that the second terminal can connect to matches the role type information of the first terminal, it indicates that the first terminal matches the second terminal.

For example, if the type information of the role that the second terminal can connect to is an AP, and the role type information of the first terminal is an AP, it indicates that the first terminal matches the second terminal.

In the foregoing, a device role type correspondence that an STA corresponds to an AP is used as an example for describing how to determine that the first type information matches the second type information. When the device role type correspondence is that a P2P GO corresponds to a P2P client, that a master corresponds to a non-master, that a STA corresponds to a repeater, or that an AP corresponds to a repeater, a match determining process is the same as that for the correspondence that a STA corresponds to an AP. Details are not described again.

For another example, if the first terminal determines that the second type information is the role type information of the second terminal, the role type information of the second terminal is a P2P device, and the type information of the role that the second terminal can connect to is a P2P device, that is, the role type information of the second terminal is the same as the type information of the role that the second terminal can connect to, the first terminal only needs to determine whether the role type information of the first terminal is a P2P device. If the role type information of the first terminal is a P2P device, it indicates that the first terminal matches the second terminal.

For another example, if the first terminal determines that the second type information is the role type information of the second terminal, the role type information of the second terminal is a service supported by the second terminal, and the first terminal can determine that the role type information of the first terminal is a service supported by the first terminal, and if the first terminal determines that the service supported by the first terminal is the same as the service supported by the second terminal, it indicates that the first terminal matches the second terminal.

Specifically, the determining that the second signature information matches the second type information includes the following.

204: The first terminal performs a hash operation on at least the second type information to generate a second hash value.

The hash operation is a prior art, and details are not described in this embodiment.

205: The first terminal decrypts the second signature information by using the public key for signature, to obtain a first hash value.

Specifically, the first hash value is a hash value generated by the configuration device by performing the hash operation on at least the second type information. The first terminal can decrypt the second signature information by using the public key for signature, to obtain the first hash value.

206: The first terminal determines whether the first hash value is equal to the second hash value, that is, the first terminal determines whether the second signature information matches the second type information.

Specifically, the configuration device generates the first hash value for first predetermined information, and the first terminal generates the second hash value for second predetermined information. When the first predetermined information is equal to the second predetermined information, the first hash value is equal to the second hash value.

It should be clear that, in the foregoing implementation process, the first terminal uses step 203 to determine that the first type information matches the second type information.

In this embodiment of the present invention, an execution sequence for the steps of calculating the hash values and the step of determining whether the first type information matches the second type information may be altered. When the first type information matches the second type information and the first terminal determines that the second signature information matches the second type information, the first terminal determines that the second terminal is authenticated, and the first terminal generates a key.

In this embodiment, the first terminal generates the key information based on at least the following: the first type information matches the second type information and the first hash value is equal to the second hash value.

In a specific application process, before generating the key information, the first terminal may further perform other verification. This is not specifically limited in this embodiment.

That is, in a specific application process, before generating the key information, the first terminal may further perform other verification on information such as a net ID and a peer key. This is not specifically limited in this embodiment.

For example, the first terminal receives a message that is sent by the second terminal and that carries the foregoing information.

The message contains the following information:
a netID, a peerKey, and the type information of the role that the second terminal can connect to; and
a netKey, and the role type information of the second terminal.

The message may be an action message, a message obtained by modifying an existing message in 802.11, or a newly defined message.

After the first terminal receives the second signature information sent by the second terminal, the first terminal verifies whether the net-id is the same as a net-id of the first terminal, and checks whether the peerKey matches a peer's network key (that is, a network key of the first terminal) or matches a wildcard.

For details about a specific process of verifying the public key peerKey, refer to the prior art. In addition, for details about a specific process of verifying signature information of the information, refer to the prior art. Details are not further described.

207: That is, the first terminal generates a pairwise master key (PMK) based on at least the following: the first type information matches the second type information and the first hash value is equal to the second hash value.

208: The first terminal sends the first signature information to the second terminal.

In this embodiment, the first terminal may send the first signature information to the second terminal.

209: The first terminal establishes a security connection between the first terminal and the second terminal according to the key information.

Specifically, the first terminal generates the PMK by using the public key netKey of the second terminal and a private key of the first terminal, so as to establish a security connection between the first terminal and the second terminal according to the PMK.

According to the security authentication method illustrated in this embodiment, in a process of establishing a security connection between a first terminal and a second terminal, the first terminal not only needs to perform verification according to information that is used to establish the connection and included in second signature information, but also needs to verify second type information. When determining that first type information matches the second type information and that the second signature information is correct, the first terminal establishes a security connection between the first terminal and the second terminal. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

In the foregoing process, that the first terminal determines, according to the second type information sent by the second terminal, the role type information of the second terminal and/or the type information of the role that the second terminal can connect to is an example and is not intended to be a limitation.

For example, a discovery process is executed between the first terminal and the second terminal. The first terminal obtains, by using this process, the role type information of the second terminal and/or the type information of the role that the second terminal can connect to.

In the process, the second terminal may also obtain the role type information of the first terminal and/or the type information of the role that the first terminal can connect to.

For example, an 802.11 process is executed. The second terminal, acting as a STA, sends a probe request to the first terminal, and the first terminal, acting as an AP, returns a response.

The first terminal may obtain the role type information of the second terminal and/or the type information of the role that the second terminal can connect to. Similarly, the second terminal may also obtain the role type information of the first terminal and/or the type information of the role that the first terminal can connect to.

In these discovery processes, terminals with different role type information send different messages. Therefore, role type information of a terminal and/or type information of a role that the terminal can connect to may be determined according to a message sent by the terminal.

In the embodiments shown in FIG. 1 and FIG. 2, how security authentication is performed between the first terminal and the second terminal so as to establish a security connection is described. The following describes, with reference to FIG. 3, how a configuration device configures a terminal to enable the configured terminal to establish a security connection relationship with another terminal.

Figure 3:
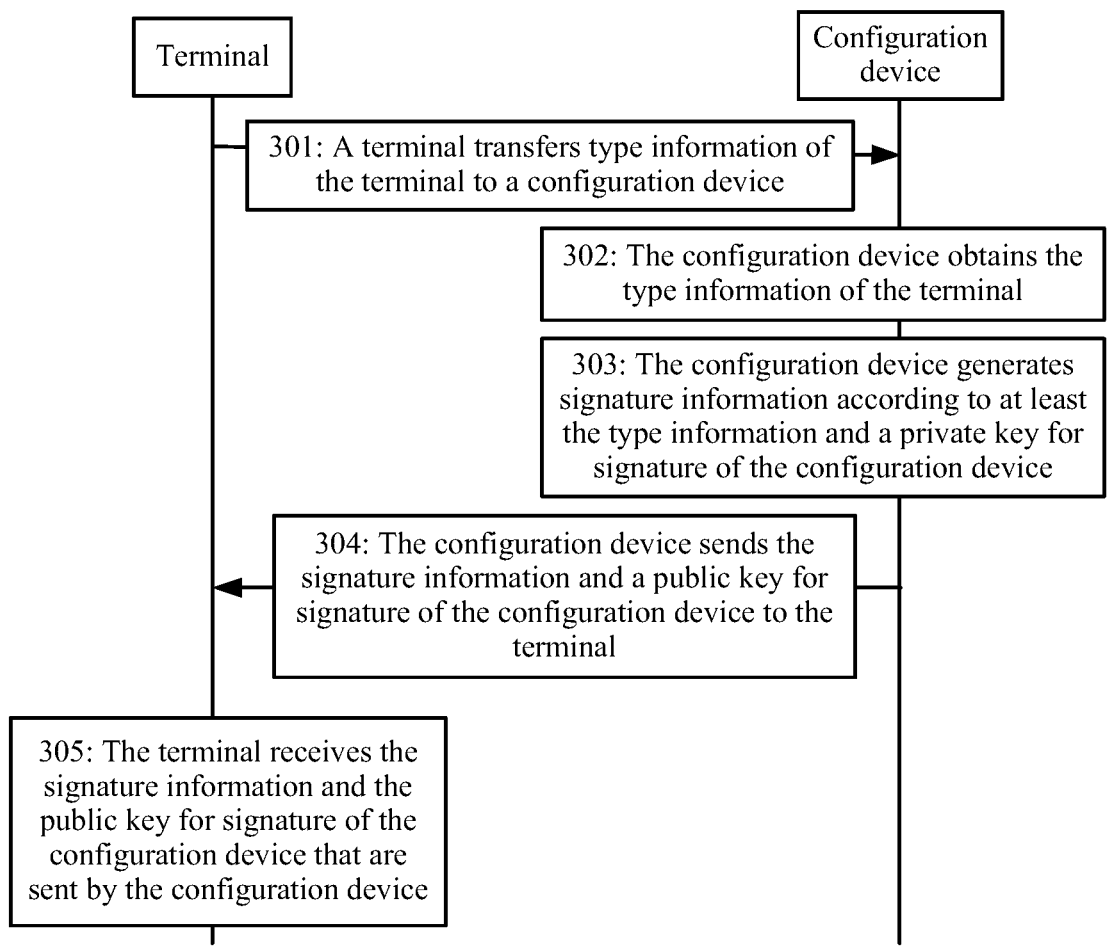
FIG. 3 is a flowchart of steps in a configuration method according to an embodiment of the present invention.

FIG. 3 is a flowchart of steps in a configuration method according to an embodiment of the present invention.

301: The terminal transfers type information of the terminal to the configuration device.

The type information is role type information of the terminal and/or type information of a role that the terminal can connect to.

How specifically the terminal transfers, to the configuration device, the role type information of the terminal and/or the type information of the role that the terminal can connect to is not limited in this embodiment, provided that the configuration device can obtain the role type information of the terminal and/or the type information of the role that the terminal can connect to.

302: The configuration device obtains the type information of the terminal.

The type information is the role type information of the terminal and/or the type information of the role that the terminal can connect to.

How specifically the configuration device obtains the role type information of the terminal and/or the type information of the role that the terminal can connect to is not limited in this embodiment.

In this embodiment, the configuration device may obtain only the role type information of the terminal, or may obtain the role type information of the terminal and the type information of the role that the terminal can connect to, or may obtain only the type information of the role that the terminal can connect to.

In this embodiment, the role type information of the terminal and/or the type information of the role that the terminal can connect to that are obtained by the configuration device are not limited.

Specifically, the role type information of the terminal and/or the type information of the role that the terminal can connect to may be any of the following type information, and it should be clear that the following is merely an example description of the role type information of the terminal and constitutes no limitation;

a station (STA), an access point (AP), a point-to-point group owner device (P2P GO), a point-to-point client device (P2P client), an anchor master, a non-anchor master, a repeater, a dock center device, a dockee device, a peripheral, a source device, a sink device, a service set identifier (SSID), a Media Access Control (MAC) address, an enrollee.

Specifically, in this embodiment, the role type information of the terminal and the type information of the role that the terminal can connect to are type information of two mutually corresponding roles, and a connection can be established between two mutually corresponding terminals.

For example, if the role type information of the terminal is an AP, the type information of the role that the terminal can connect to is a STA. Conversely, if the type information of the role that the terminal can connect to is an AP, the role type information of the terminal is a STA.

For another example, the type information of the two mutually corresponding roles may be: a STA corresponds to an AP, a P2P GO corresponds to a P2P client, a master corresponds to a non-master, a STA corresponds to a repeater, or an AP corresponds to a repeater.

Specifically, if the role type information of the terminal is a repeater, the type information of the role that the terminal can connect to may be a STA, or may be an AP.

More specifically, if the role type information of the terminal is a capability supported by the terminal, the type information of the role that the terminal can connect to is correspondingly also the capability supported by the terminal.

For example, if the role type information of the terminal is a device supporting P2P, the type information of the role that the terminal can connect to is a device supporting P2P.

For another example, if the role type information of the terminal is a device supporting a neighbor awareness network (NAN), the type information of the role that the terminal can connect to is a device supporting the neighbor awareness network (NAN).

For another example, if the role type information of the terminal is a device supporting a specific base station subsystem (BSS), the type information of the role that the terminal can connect to is a device supporting the base station subsystem (BSS).

More specifically, if the role type information of the terminal is information about a specific service supported by the terminal, the type information of the role that the terminal can connect to is correspondingly also the information about the specific service supported by the terminal.

303: The configuration device generates signature information according to at least the type information and a private key for signature of the configuration device.

Specifically, the configuration device performs a hash operation on at least the type information to generate a hash value, and encrypts the generated hash value by using the private key for signature, to generate the signature information.

It should be clear that how the signature information is generated according to the private key for signature is a prior art, and details are not described in this embodiment.

304: The configuration device sends the signature information and a public key for signature of the configuration device to the terminal.

How specifically the configuration device sends the signature information and the public key for signature is not limited in this embodiment.

For example, the configuration device may send the signature information and the public key for signature to the terminal at the same time as two independent messages or one message, by using a same message, or may send the signature information and the public key for signature to the terminal sequentially. This is not specifically limited.

305: The terminal receives the signature information and the public key for signature of the configuration device that are sent by the configuration device.

The signature information is generated by the configuration device according to at least the type information and the private key for signature of the configuration device.

The public key for signature of the configuration device corresponds to the private key for signature of the configuration device, so that the terminal receiving the public key for signature can perform decryption processing on the signature information that is encrypted by using the private key for signature.

When the terminal receives the signature information and the public key for signature of the configuration device that are sent by the configuration device, configuration of the terminal by the configuration device is completed, so that the terminal can execute, based on the configuration by the configuration device, the security authentication processes shown in FIG. 1 and FIG. 2.

According to the configuration method illustrated in this embodiment, a configuration device sends signature information and a public key for signature of the configuration device to a terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 4:
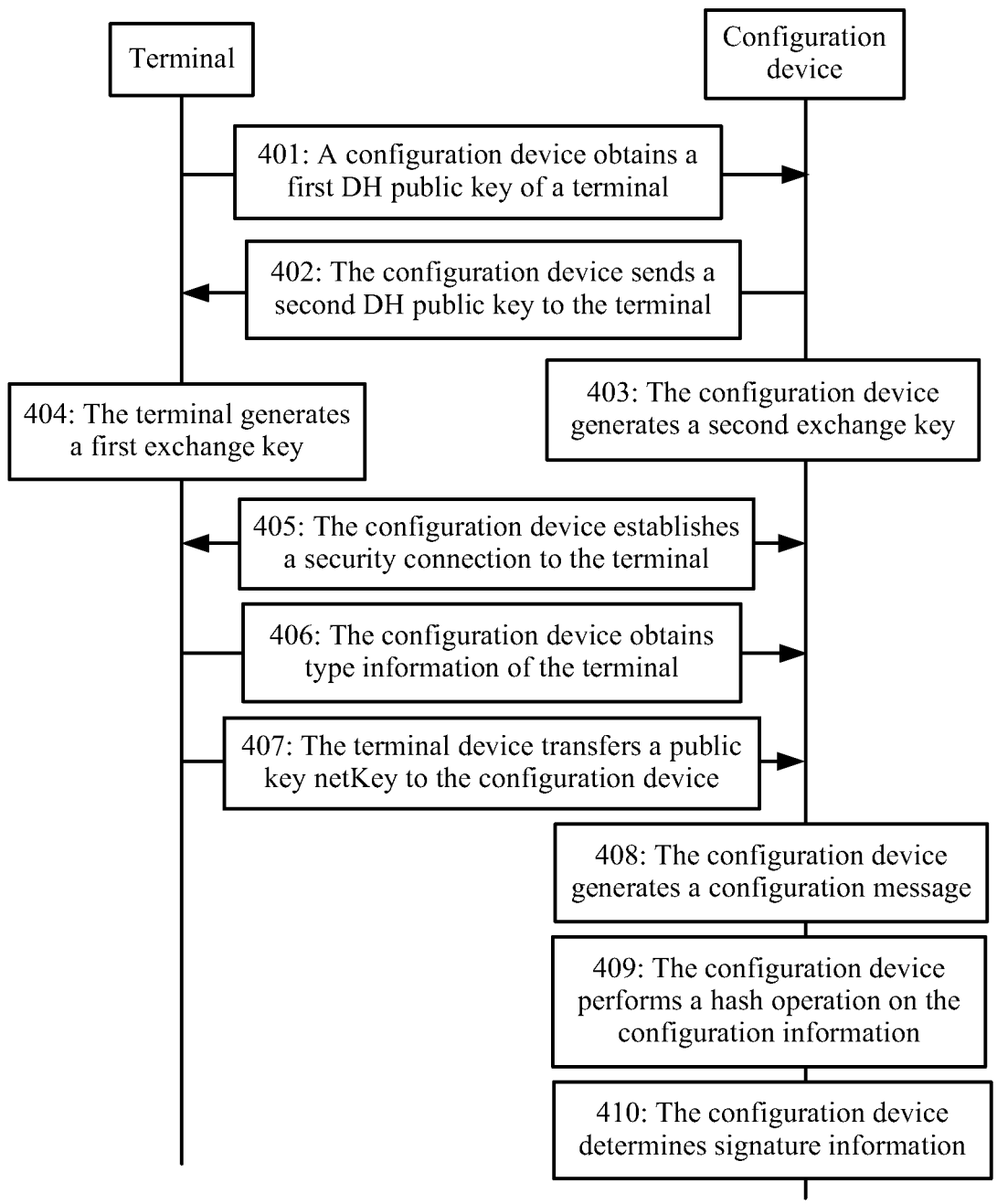
FIG. 4 is another flowchart of steps in a configuration method according to an embodiment of the present invention.

The following describes in detail, with reference to FIG. 4, how specifically a configuration device configures a terminal. FIG. 4 is another flowchart of steps in a configuration method according to an embodiment of the present invention.

401: The configuration device obtains a first Diffie-Hellman (DH) public key of the terminal.

Specifically, the terminal possesses the first DH public key and a first DH private key that are used for key exchange. The configuration device possesses a second DH public key and a second DH private key that are used for key exchange.

A manner in which the configuration device obtains the first DH public key may be: The configuration device scans a quick response code that is of the terminal and that contains the first DH public key, or the terminal sends the first DH public key of the terminal to the configuration device. This is not specifically limited.

402: The configuration device sends a second DH public key to the terminal.

403: The configuration device generates a second exchange key.

Specifically, the configuration device calculates the second exchange key by using a key exchange algorithm according to the first DH public key and the second DH private key.

The key exchange algorithm may be a DH algorithm or an Elliptic Curve Diffie Hellman (ECDH) algorithm. For details, refer to the prior art, and the details are not described.

404: The terminal generates a first exchange key.

Specifically, the terminal calculates the first exchange key by using the key exchange algorithm according to the second DH public key and the first DH private key.

405: The configuration device establishes a security connection to the terminal.

Specifically, the first exchange key and the second exchange key are pairwise. Based on the pairwise key or a derivative key of the pairwise key, the configuration device can establish a security connection to the terminal.

When specifically the configuration device obtains type information of the terminal is not limited in this embodiment.

For example, the configuration device may obtain, in a process of establishing a security connection to the terminal, role type information of the terminal and/or type information of a role that the terminal can connect to.

For another example, the configuration device may obtain, after successfully establishing a security connection to the terminal, the role type information of the terminal and/or the type information of the role that the terminal can connect to.

The following first describes how the configuration device obtains the type information in a process of establishing a security connection by the configuration device to the terminal.

The configuration device obtains a public identity key of the terminal.

Specifically, the configuration device obtains the public identity key identity key in a QR-code of the terminal.

More specifically, a specific manner in which the configuration device obtains the public identity key of the terminal is not limited. For example, the terminal may send a message that contains the public identity key to the configuration device, or the configuration device scans a quick response code that is of the terminal and that contains the public identity key.

The configuration device sends a first target hash value corresponding to the public identity key to the terminal.

Specifically, the configuration device performs a hash operation on the public identity key to generate the first target hash value.

More specifically, the configuration device sends a dual path PKI (DPP) authentication request message that contains the first target hash value to the terminal.

The DPP authentication request may be H(EI), H(CI), CE, {C-nonce}K1→.

H(EI) is the first target hash value generated by using the public identity key identity key of the terminal, and H(CI) is a hash value generated by using a public identity key identity key of the configuration device.

If the terminal determines that the first target hash value meets a preset requirement, the terminal generates a response message.

Specifically, after the terminal receives the DPP authentication request message, the terminal performs a hash operation on the public identity key of the terminal to generate a second target hash value.

The preset requirement is that the first target hash value is equal to the second target hash value.

The response message DPP authentication response may be DPP authentication response: ←H(EI), [H(CI),] { E-nonce|C-nonce|EN}K1, {E-auth}Ke.

The response message given in this embodiment further carries the role type information of the terminal and/or the type information of the role that the terminal can connect to.

The terminal sends the response message to the configuration device.

The configuration device determines, according to the response message, the role type information of the terminal and/or the type information of the role that the terminal can connect to.

After determining the role type information of the terminal and/or the type information of the role that the terminal can connect to, the configuration device sends an acknowledgment message to the terminal.

The acknowledgment message DPP authentication confirm is: H(EI), [H(CI),] {C-auth}Ke→.

In this embodiment, the following example is used for description: After successfully establishing a security connection to the terminal, the configuration device obtains the role type information of the terminal and/or the type information of the role that the terminal can connect to.

That is, after steps 401 to 405 are performed to enable the configuration device to successfully establish a security connection to the terminal, step 406 is performed.

406: The configuration device obtains type information of the terminal.

The type information of the terminal is the role type information of the terminal and/or the type information of the role that the terminal can connect to.

In this embodiment, the configuration device obtains the role type information of the terminal and/or the type information of the role that the terminal can connect to in the following cases. It should be clear that a manner in which the configuration device obtains the role type information of the terminal and/or the type information of the role that the terminal can connect to is used as an example for description without imposing any limitation.

In one case, the configuration device receives an indication message sent by the terminal.

The terminal may indicate, in the indication message, the role type information of the terminal and/or the type information of the role that the terminal can connect to.

In another case, the configuration device receives a discovery message sent by the terminal; and the configuration device determines the type information according to the discovery message.

The discovery message corresponds to the type information.

For example, a discovery process is executed between the configuration device and the terminal. The configuration device obtains, in the process, the role type information of the terminal and/or the type information of the role that the terminal can connect to.

For example, in an 802.11 execution process, if the configuration device determines that the received discovery message is a probe request, the configuration device may determine that the role type information of the terminal is a STA, and/or the configuration device may determine that the type information of the role that the terminal can connect to is an AP.

If the discovery message received by the configuration device is a response, the configuration device may determine that the role type information of the terminal is an AP, and/or the configuration device may determine that the type information of the role that the terminal can connect to is a STA.

A reason why the configuration device uses this determining manner is: in these discovery processes, terminals of different roles send different discovery messages. Therefore, the configuration device may determine, according to a different discovery message sent by a terminal, role type information of the terminal and/or type information of a role that the terminal can connect to.

In another case, the configuration device is provided with an operation interface, and a user may input an operation instruction by using the operation interface, so that the user directly indicates the type information by using the operation instruction.

For example, the user chooses to input a configuration device to a network, the configuration device obtains that a role type of a terminal device is a STA, and that a type of a device that the terminal device can connect to is an AP. For example, the user chooses to input a configuration network, the configuration device obtains that the role type of the terminal device is an AP, and that the type of the device that the terminal device can connect to is an STA.

In another case, the configuration device may scan a quick response code of the terminal, and the quick response code of the terminal contains the type information, so that the configuration device can directly obtain, by scanning the quick response code, the role type information of the terminal and/or the type information of the role that the terminal can connect to.

In another case, the configuration device establishes a near field communication (NFC) connection to the terminal, so that the configuration device can obtain the type information by using the NFC connection.

407: The terminal device transfers a public key netKey to the configuration device.

408: The configuration device generates a configuration message.

In this embodiment, the configuration message includes at least the public key netKey, a public key for signature of the configuration device, and the type information of the terminal.

Certainly, the configuration message may further include other content. This is not specifically limited in this embodiment.

Specifically, the configuration message DPP configuration response may be:

```
{ net-id, cruft, C-name, C-sign-key, connector, [ connector ...] [ ,
configurators ] [ , introducers ] } Ke →.
    The field Connector ::=
    SEQUENCE {
    netID      INTEGER,
    peerKey    SubjectPublicKeyInfo,
    the type information of the role that the terminal can connect to:
    netKey     SubjectPublicKeyInfo, and
    the role type information of the terminal:
    introducer DirectoryString }.
```

409: The configuration device performs a hash operation on the configuration message.

410: The configuration device determines signature information.

The signature information is formed by encrypting, by using the private key for signature of the configuration device, the configuration message that undergoes a hash operation.

The hash hash operation is a hash algorithm. The hash algorithm can generate some other numbers by means of a hash operation on some input numbers. The hash algorithm is unidirectional.

Specifically, in this embodiment, the signature information includes a first hash value. The first hash value is a hash value generated by the configuration device by performing a hash operation on the role type information of the terminal and/or the type information of the role that the terminal can connect to.

According to the configuration method illustrated in this embodiment, a configuration device sends signature information and a public key for signature of the configuration device to a terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 5:
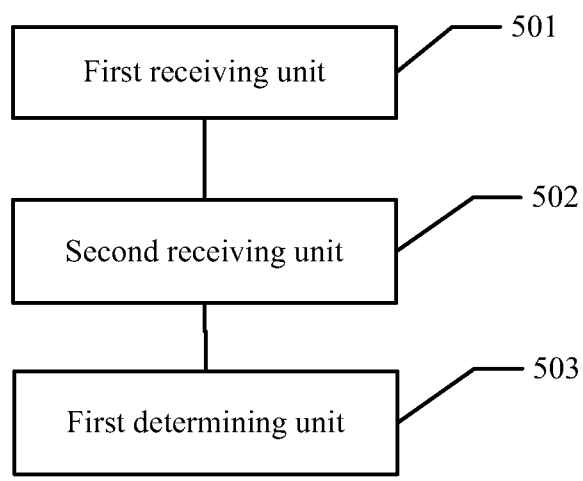
FIG. 5 is a schematic structural diagram of a first terminal according to an embodiment of the present invention.

The following describes in detail, with reference to FIG. 5, a specific structure of a first terminal in the security authentication method shown in FIG. 1. FIG. 5 is a schematic structural diagram of the first terminal according to an embodiment of the present invention.

The first terminal includes:

a first receiving unit 501, configured to receive a public key for signature of a configuration device sent by the configuration device;

a second receiving unit 502, configured to receive second signature information and second type information, where the second signature information is signature information sent by the configuration device to a second terminal, the second signature information is generated by the configuration device according to at least the second type information and a private key for signature of the configuration device, the second type information is role type information of the second terminal and/or type information of a role that the second terminal can connect to, and the public key for signature of the configuration device corresponds to the private key for signature of the configuration device; and a first determining unit 503, configured to determine, according to at least the second type information and the second signature information, that key information is to be generated, where the key information is used for the first terminal to establish a security connection to the second terminal.

In this embodiment, in a process of establishing a security connection between a first terminal and a second terminal, the first terminal not only needs to perform verification according to information that is used to establish the connection and included in second signature information, but also needs to verify type information of the second terminal. The first terminal establishes the security connection between the first terminal and the second terminal only when the verification succeeds. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 6:
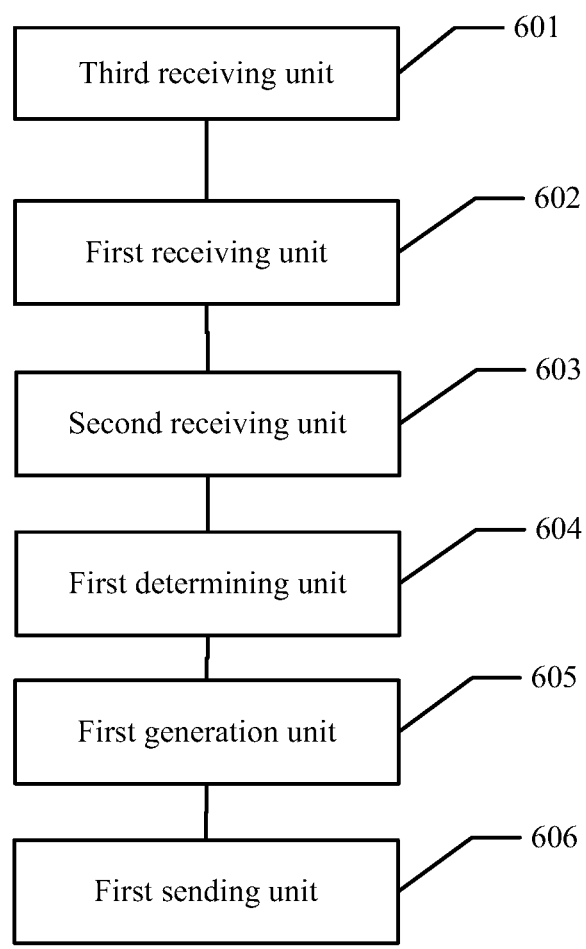
FIG. 6 is another schematic structural diagram of a first terminal according to an embodiment of the present invention.

The following describes in detail, with reference to FIG. 6, a specific structure of a first terminal in the security authentication method shown in FIG. 2. FIG. 6 is another schematic structural diagram of the first terminal according to an embodiment of the present invention.

A third receiving unit 601 is configured to receive first signature information sent by a configuration device. The first signature information is generated by the configuration device according to at least first type information and a private key for signature, and the first type information is role type information of the first terminal and/or type information of a role that the first terminal can connect to.

The role type information of the first terminal and/or the type information of the role that the first terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

A first receiving unit 602 is configured to receive a public key for signature of the configuration device sent by the configuration device.

A second receiving unit 603 is configured to receive second signature information and second type information. The second signature information is signature information sent by the configuration device to a second terminal, the second signature information is generated by the configuration device according to at least the second type information and the private key for signature of the configuration device. The second type information is role type information of the second terminal and/or type information of a role that the second terminal can connect to. The public key for signature of the configuration device corresponds to the private key for signature of the configuration device.

The role type information of the second terminal and/or the type information of the role that the second terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

A first determining unit 604 is configured to determine, according to at least the second type information and the second signature information, that key information is to be generated. The key information is used for the first terminal to establish a security connection to the second terminal.

Specifically, the first determining unit 604 is further configured to, when it is determined that the first type information matches the second type information and the first terminal determines that the second signature information matches the second type information, determine that the first terminal is to generate the key information.

A first generation unit 605 is configured to generate the key information.

A first sending unit 606 is configured to send the first signature information to the second terminal.

According to the first terminal in this embodiment, in a process of establishing a security connection between the first terminal and a second terminal, the first terminal not only needs to perform verification according to information that is used to establish the connection and included in second signature information, but also needs to verify second type information. When determining that first type information matches the second type information and that the second signature information is correct, the first terminal establishes a security connection between the first terminal and the second terminal. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 7:
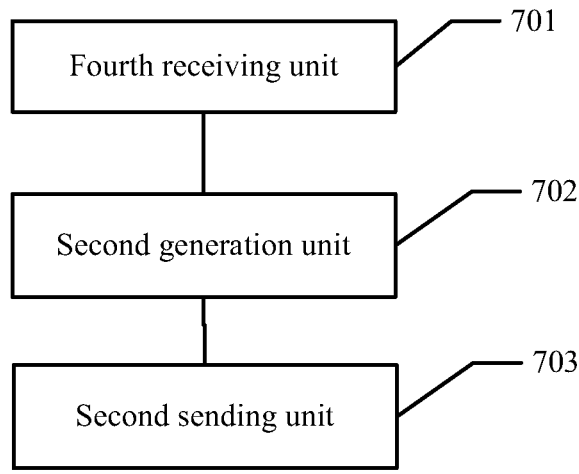
FIG. 7 is a schematic structural diagram of a configuration device according to an embodiment of the present invention.

The following describes, with reference to FIG. 7, a specific structure of a configuration device that can implement terminal configuration so that a security connection can be established between terminals. FIG. 7 is a schematic structural diagram of the configuration device according to an embodiment of the present invention.

The configuration device includes:

a fourth receiving unit 701, configured to obtain type information of the terminal, where the type information is role type information of the terminal and/or type information of a role that the terminal can connect to;

a second generation unit 702, configured to generate signature information according to at least the type information and a private key for signature of the configuration device; and a second sending unit 703, configured to send the signature information and a public key for signature of the configuration device to the terminal, where the public key for signature of the configuration device corresponds to the private key for signature of the configuration device.

According to the configuration device illustrated in this embodiment, the configuration device sends signature information and a public key for signature of the configuration device to a terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 8:
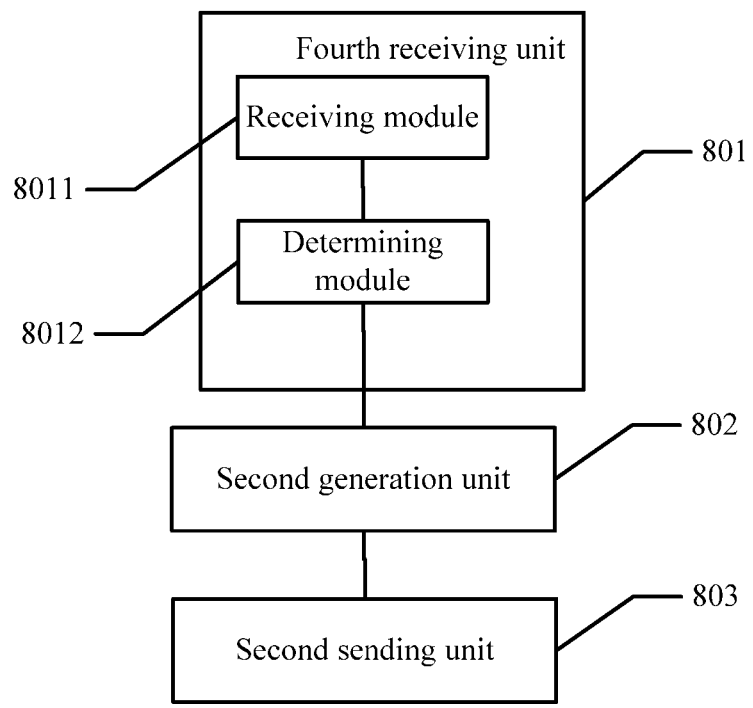
FIG. 8 is another schematic structural diagram of a configuration device according to an embodiment of the present invention.

The following further describes in detail, with reference to FIG. 8, a specific structure of the configuration device. FIG. 8 is another schematic structural diagram of the configuration device according to an embodiment of the present invention.

A fourth receiving unit 801 is configured to obtain type information of a terminal. The type information is role type information of the terminal and/or type information of a role that the terminal can connect to.

The role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

The fourth receiving unit 801 is further configured to receive an indication message sent by the terminal. The indication message contains the type information.

The fourth receiving unit 801 is further configured to receive an operation instruction inputted by a user. The operation instruction is used to indicate the type information.

The fourth receiving unit 801 is further configured to scan a quick response code that is of the terminal and that contains the type information.

The fourth receiving unit 801 is further configured to establish a near field communication (NFC) connection to the terminal to obtain the type information.

Optionally, the fourth receiving unit 801 includes:

a receiving module 8011, configured to receive a discovery message sent by the terminal; and a determining module 8012, configured to determine the type information according to the discovery message, where the discovery message corresponds to the type information.

A second generation unit 802 is configured to generate signature information according to at least the type information and a private key for signature of the configuration device.

The signature information further includes a first hash value. The first hash value is a hash value generated by the configuration device by performing a hash operation on at least the type information.

A second sending unit 803 is configured to send the signature information and a public key for signature of the configuration device to the terminal. The public key for signature of the configuration device corresponds to the private key for signature of the configuration device.

According to the configuration device illustrated in this embodiment, the configuration device sends signature information and a public key for signature of the configuration device to a terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

FIG. 7 and FIG. 8 describe, from a perspective of a configuration device, specific structures of the configuration device when the configuration device configures a terminal device. The following describes, with reference to FIG. 9, a specific structure of a terminal when a configuration device configures the terminal device.

Figure 9:
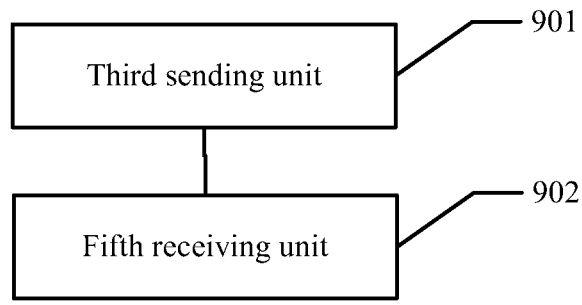
FIG. 9 is a schematic structural diagram of a terminal according to an embodiment of the present invention.

FIG. 9 is a schematic structural diagram of the terminal according to an embodiment of the present invention.

The terminal includes:

a third sending unit 901, configured to transfer type information of the terminal to the configuration device, where the type information is role type information of the terminal and/or type information of a role that the terminal can connect to; and a fifth receiving unit 902, configured to receive signature information and a public key for signature of the configuration device that are sent by the configuration device, where the signature information is generated by the configuration device according to at least the type information and a private key for signature of the configuration device, and the public key for signature of the configuration device corresponds to the private key for signature of the configuration device.

According to the terminal illustrated in this embodiment, a configuration device sends signature information and a public key for signature of the configuration device to the terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

Figure 10:
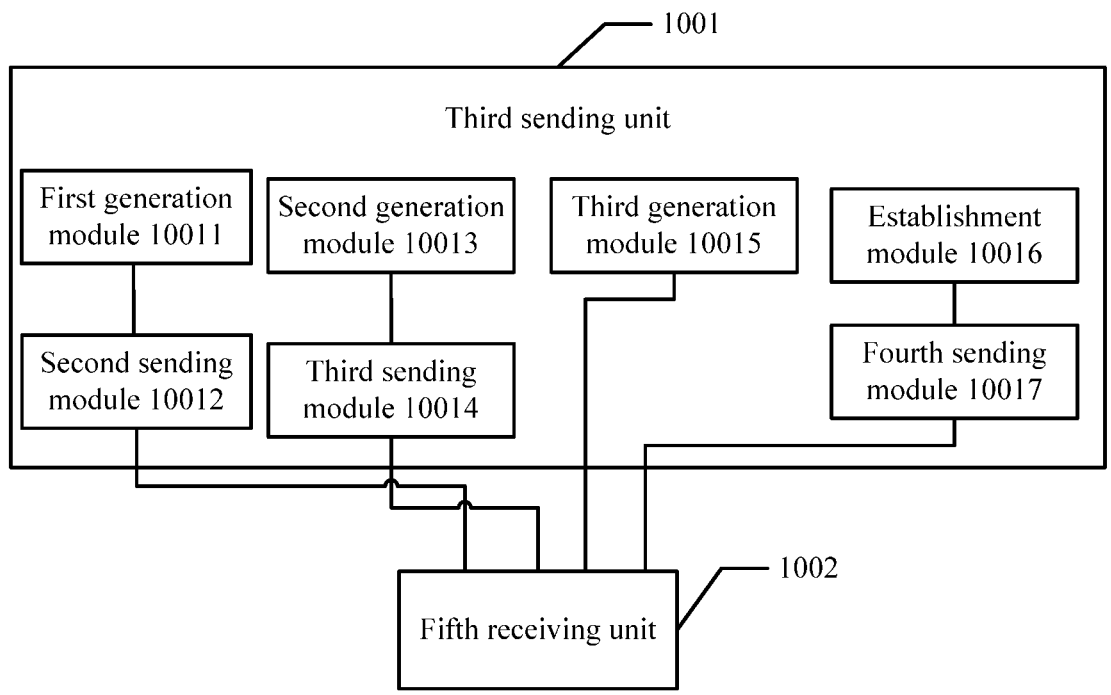
FIG. 10 is another schematic structural diagram of a terminal according to an embodiment of the present invention.

The following further describes in detail, with reference to FIG. 10, a specific structure of the terminal.

FIG. 10 is another schematic structural diagram of the terminal according to an embodiment of the present invention.

The terminal includes the following units.

A third sending unit 1001 is configured to transfer type information of the terminal to a configuration device, where the type information is role type information of the terminal and/or type information of a role that the terminal can connect to.

Specifically, the third sending unit 1001 includes:
a first generation module 10011, configured to generate an indication message, where the indication message contains the type information; and
a second sending module 10012, configured to send the indication message to the configuration device.

Alternatively,
the third sending unit 1001 includes:
a second generation module 10013, configured to generate a discovery message; and
a third sending module 10014, configured to send the discovery message to the configuration device, where the discovery message corresponds to the type information.

Alternatively,
the third sending unit 1001 includes:
a third generation module 10015, configured to generate a quick response code, where the quick response code contains the type information.

Alternatively,
the third sending unit 1001 includes:
an establishment module 10016, configured to establish a near field communication (NFC) connection to the configuration device; and
a fourth sending module 10017, configured to send the type information to the configuration device by using the NFC.

A fifth receiving unit 1002 is configured to receive signature information and a public key for signature of the configuration device that are sent by the configuration device. The signature information is generated by the configuration device according to at least the type information and a private key for signature of the configuration device, and the public key for signature of the configuration device corresponds to the private key for signature of the configuration device.

The role type information of the terminal and/or the type information of the role that the terminal can connect to include/includes:
a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

According to the terminal illustrated in this embodiment, a configuration device sends signature information and a public key for signature of the configuration device to the terminal, so that when the terminal needs to access another terminal, the terminal can send the signature information sent by the configuration device and type information of the terminal to the another terminal. Accordingly, the another terminal not only needs to verify whether the signature information is correct, but also needs to verify whether the terminals match. A security connection relationship is established between the two terminals only when type information of the two terminals matches each other and the signature information is correct. This effectively prevents a terminal from tampering with its role, and therefore effectively prevents a terminal from establishing a connection to an attacker terminal with a changed role, thereby further preventing the attacker terminal from obtaining information of the terminal, to effectively ensure security of the terminal.

In the embodiments shown in FIG. 5 and FIG. 6, specific structures of a first terminal are described from a perspective of function modules. The following describes a specific structure of a first terminal from a perspective of hardware with reference to an embodiment shown in FIG. 11.

Figure 11:
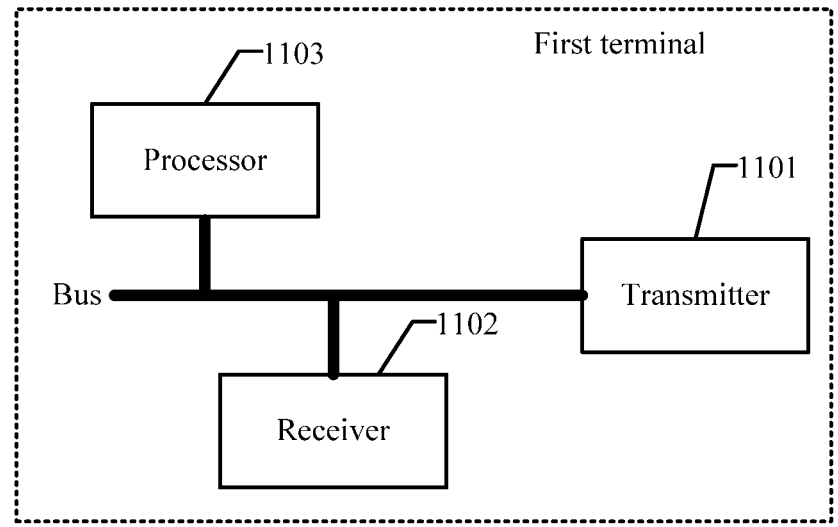
FIG. 11 is another schematic structural diagram of a first terminal according to an embodiment of the present invention.

As shown in FIG. 11, the first terminal includes a transmitter 1101, a receiver 1102, and a processor 1103. There may be one or more processors 1103. In this embodiment, one processor is used as an example for description.

In addition, in this embodiment, the transmitter 1101, the receiver 1102, and the processor 1103 are connected by using a bus, or certainly may be connected in another connection manner. A specific connection manner is not limited in this embodiment.

The first terminal involved in this embodiment of the present invention may have more or less parts than those shown in FIG. 11, may combine two or more parts, or may have different part configurations or settings. Each part may be implemented by using hardware including one or more signal processing and/or application-specific integrated circuits, software, or a combination of hardware and software.

The receiver 1102 is configured to receive a public key for signature of a configuration device sent by the configuration device.

The receiver 1102 is configured to receive second signature information and second type information. The second signature information is signature information sent by the configuration device to a second terminal. The second signature information is generated by the configuration device according to at least the second type information and a private key for signature of the configuration device. The second type information is role type information of the second terminal and/or type information of a role that the second terminal can connect to. The public key for signature of the configuration device corresponds to the private key for signature of the configuration device.

The processor 1103 is configured to determine, according to at least the second type information and the second signature information, that the first terminal is to generate key information. The key information is used for the first terminal to establish a security connection to the second terminal.

Optionally, the receiver 1102 is configured to receive first signature information sent by the configuration device. The first signature information is generated by the configuration device according to at least the first type information and the private key for signature. The first type information is role type information of the first terminal and/or type information of a role that the first terminal can connect to.

Optionally, the role type information of the first terminal and/or the type information of the role that the first terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

Optionally, the role type information of the second terminal and/or the type information of the role that the second terminal can connect to include/includes:

a station, an access point, a point-to-point group owner device, a point-to-point client device, an anchor master, a non-anchor master, a repeater, a dock center device, a dockee device, a peripheral, a source device, a sink device, a configurator, an enrollee, a supported capability, a supported service, a service set identifier, or a Media Access Control address.

Optionally, the processor 1103 is configured to, when it is determined that the first type information matches the second type information and the first terminal determines that the second signature information matches the second type information, determine to generate key information.

Optionally, the processor 1103 is configured to generate the key information.

Optionally, the transmitter 1101 is configured to send the first signature information to the second terminal.

In the embodiments shown in FIG. 7 and FIG. 8, specific structures of a configuration device are described from a perspective of function modules. The following describes a specific structure of a configuration device from a perspective of hardware with reference to an embodiment shown in FIG. 12.

Figure 12:
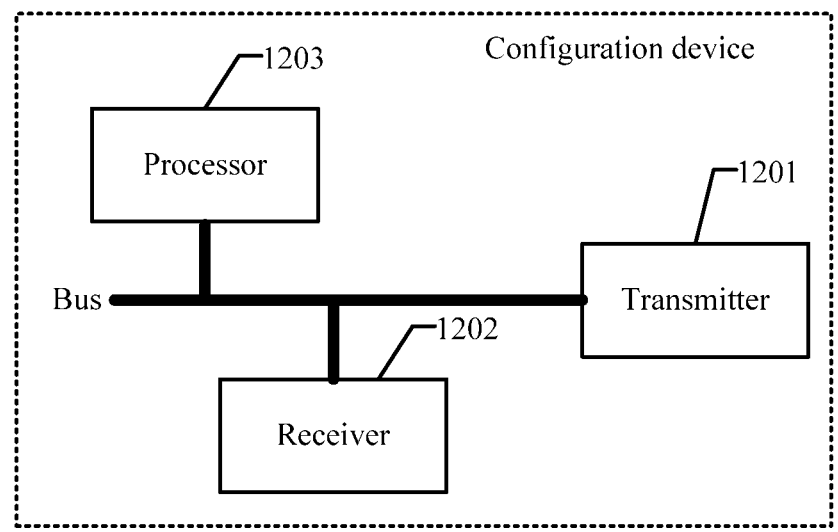
FIG. 12 is another schematic structural diagram of a configuration device according to an embodiment of the present invention.

As shown in FIG. 12, the configuration device includes a transmitter 1201, a receiver 1202, and a processor 1203. There may be one or more processors 1203. In this embodiment, one processor is used as an example for description.

In this embodiment, the transmitter 1201, the receiver 1202, and the processor 1203 are connected by using a bus, or certainly may be connected in another connection manner. A specific connection manner is not limited in this embodiment.

The configuration device involved in this embodiment of the present invention may have more or less parts than those shown in FIG. 12, may combine two or more parts, or may have different part configurations or settings. Each part may be implemented by using hardware including one or more signal processing and/or application-specific integrated circuits, software, or a combination of hardware and software.

The receiver 1202 is configured to obtain type information of a terminal. The type information is role type information of the terminal and/or type information of a role that the terminal can connect to.

The processor 1203 is configured to generate signature information according to at least the type information and a private key for signature of the configuration device.

The transmitter 1201 is configured to send the signature information and a public key for signature of the configuration device to the terminal. The public key for signature of the configuration device corresponds to the private key for signature of the configuration device.

Optionally, the receiver 1202 is configured to receive an indication message sent by the terminal. The indication message contains the type information.

Optionally, the receiver 1202 is configured to receive a discovery message sent by the terminal.

The processor 1203 is configured to determine the type information according to the discovery message. The discovery message corresponds to the type information.

Optionally, the receiver 1202 is configured to receive an operation instruction inputted by a user. The operation instruction is used to indicate the type information.

Optionally, the receiver 1202 is configured to scan a quick response code that is of the terminal and that contains the type information.

Alternatively, the receiver 1202 is configured to establish a near field communication (NFC) connection to the terminal to obtain the type information.

Optionally, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

Optionally, the signature information further includes a first hash value. The first hash value is a hash value generated by the configuration device by performing a hash operation on at least the type information.

In the embodiments shown in FIG. 9 and FIG. 10, specific structures of a terminal are described from a perspective of function modules. The following describes a specific structure of a terminal from a perspective of hardware with reference to an embodiment shown in FIG. 13.

Figure 13:
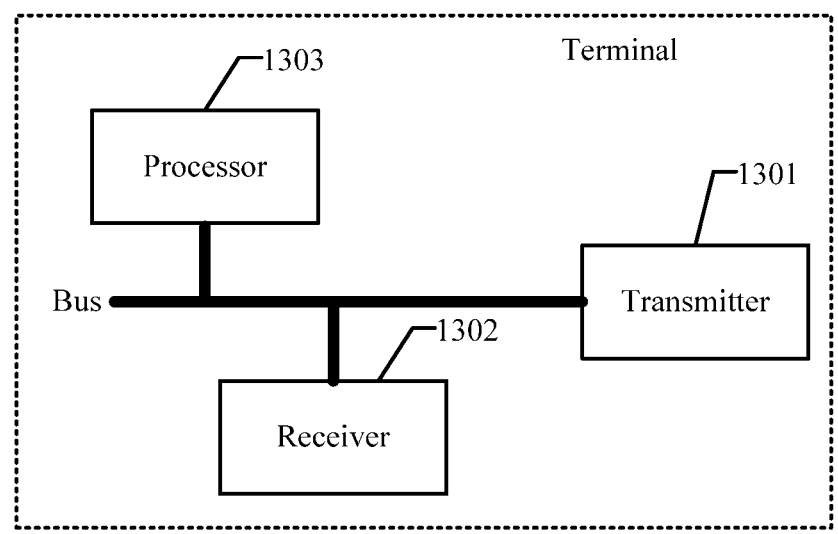
FIG. 13 is another schematic structural diagram of a terminal according to an embodiment of the present invention.

As shown in FIG. 13, the terminal includes a transmitter 1301, a receiver 1302, and a processor 1303. There may be one or more processors 1303. In this embodiment, one processor is used as an example for description.

In this embodiment, the transmitter 1301, the receiver 1302, and the processor 1303 are connected by using a bus, or certainly may be connected in another connection manner. A specific connection manner is not limited in this embodiment.

The terminal involved in this embodiment may have more or less parts than those shown in FIG. 13, may combine two or more parts, or may have different part configurations or settings. Each part may be implemented by using hardware including one or more signal processing and/or application-specific integrated circuits, software, or a combination of hardware and software.

The terminal includes:

the transmitter 1301, configured to transfer type information of the terminal to a configuration device, where the type information is role type information of the terminal and/or type information of a role that the terminal can connect to; and the receiver 1302, configured to receive signature information and a public key for signature of the configuration device that are sent by the configuration device, where the signature information is generated by the configuration device according to at least the type information and a private key for signature of the configuration device, and the public key for signature of the configuration device corresponds to the private key for signature of the configuration device.

Optionally, the processor 1303 is configured to generate an indication message, where the indication message contains the type information; and the transmitter 1301 is configured to send the indication message to the configuration device.

Optionally, the processor 1303 is configured to generate a discovery message; and the transmitter 1301 is configured to send the discovery message to the configuration device, where the discovery message corresponds to the type information.

Optionally, the processor 1303 is configured to generate a quick response code, and the quick response code contains the type information.

Alternatively, the processor 1303 is configured to establish a near field communication (NFC) connection to the configuration device; and the transmitter 1301 is configured to send the type information to the configuration device by using the NFC.

Optionally, the role type information of the terminal and/or the type information of the role that the terminal can connect to include/includes:

a station, an access point, a point-to-point group owner device, a point-to-point client device, an anchor master, a non-anchor master, a repeater, a dock center device, a dockee device, a source device, a peripheral, a sink device, a service set identifier, a Media Access Control address, or an enrollee.

It may be understood by a person skilled in the art that, for the purpose of convenient and brief description, for a detailed working process of the foregoing system, apparatus, or unit, reference may be made to a corresponding process in the foregoing method embodiments, and details are not described herein again.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for establishing a secured connection, comprising:
    receiving, by a first device from a configuration device, a public key for signature of the configuration device;
    receiving, by the first device from a second device, a second signature and a role type of the second device, wherein the second signature is generated by the configuration device according to at least the role type of the second device and a private key for signature of the configuration device, and the public key for signature of the configuration device corresponds to the private key for signature of the configuration device; and
    generating, by the first device, a key for establishing a secured connection between the first device and the second device when conditions are met, wherein the conditions comprise:
    a role type of the first device matches the role type of the second device, and a verification of the second signature is successful; wherein the role type of the first device matches the role type of the second device when any one of the following is met:
    the role type of the second device is an access point, and the role type of the first device is a station;
    the role type of the second device is a station, and the role type of the first device is an access point;
    the role type of the second device is a Peer to Peer (P2P) client, and the role type of the first device is a P2P group owner; or
    the role type of the second device is a P2P group owner, and the role type of the first device is a P2P client.

2. The method according to claim 1, further comprising:
    receiving, by the first device from the configuration device, a first signature, wherein the first signature is generated by the configuration device according to at least the role type of the first device and the private key for signature of the configuration device.

3. The method according to claim 1, wherein the conditions further comprise:
    a net-id received from the second device is the same as a net-id of the first device.

4. The method according to claim 1, wherein the verification of the second signature is successful comprises:
    the second signature matches the role type of the second device.

5. The method according to claim 2, further comprising:
    sending, by the first device, the first signature to the second device.

6. The method according to claim 2, wherein the conditions further comprise:
    a net-id received from the second device is the same as a net-id of the first device.

7. The method according to claim 4, wherein the second signature matches the role type of the second device comprises:
    a first hash value is equal to a second hash value, wherein the first hash value is a hash value generated by the configuration device by performing a hash operation on at least the role type of the second device and is obtained by the first device by decrypting the second signature by using the public key for signature of the configuration device, and the second hash value is generated by the first device by performing the hash operation on at least the role type of the second device.

8. The method according to claim 5, wherein the conditions further comprise:
    a net-id received from the second device is the same as a net-id of the first device.

9. A first device, comprising a receiver, a transmitter, and a processor connected to the receiver and the transmitter; wherein
    the receiver is configured to:
        receive, from a configuration device, a public key for signature of the configuration device; and receive, from a second device, a second signature and a role type of the second device, wherein the second signature is generated by the configuration device according to at least the role type of the second device and a private key for signature of the configuration device, and the public key for signature of the configuration device corresponds to the private key for signature of the configuration device;

the processor is configured to:
generate a key for establishing a secured connection between the first device and the second device when conditions are met, wherein the conditions comprise:
a role type of the first device matches the role type of the second device, and a verification of the second signature is successful;

wherein the role type of the first device matches the role type of the second device when any one of the following is met:

the role type of the second device is an access point, and the role type of the first device is a station;

the role type of the second device is a station, and the role type of the first device is an access point;

the role type of the second device is a Peer to Peer (P2P) client, and the role type of the first device is a P2P group owner; or the role type of the second device is a P2P group owner, and the role type of the first device is a P2P client.

10. The first device according to claim 9, wherein the receiver is further configured to:
receive, from the configuration device, a first signature, wherein the first signature is generated by the configuration device according to at least the role type of the first device and the private key for signature of the configuration device.

11. The first device according to claim 9, wherein the conditions further comprise:
a net-id received from the second device is the same as a net-id of the first device.

12. The first device according to claim 9, wherein the verification of the second signature is successful comprises:
the second signature matches the role type of the second device.

13. The first device according to claim 10, wherein the transmitter is configured to:
send the first signature to the second device.

14. The first device according to claim 10, wherein the conditions further comprise:
a net-id received from the second device is the same as a net-id of the first device.

15. The first device according to claim 12, wherein the second signature matches the role type of the second device comprises:
a first hash value is equal to a second hash value,
wherein the first hash value is a hash value generated by the configuration device by performing a hash operation on at least the role type of the second device and is obtained by the first device by decrypting the second signature by using the public key for signature of the configuration device, and the second hash value is generated by the first device by performing the hash operation on at least the role type of the second device.

16. The first device according to claim 13, wherein the conditions further comprise:
a net-id received from the second device is the same as a net-id of the first device.

17. A non-transitory computer-readable medium storing a program, wherein when executed by a first device, the program causes the first device to:
receive, from a configuration device, a public key for signature of the configuration device;
receive, from a second device, a second signature and a role type of the second device, wherein the second signature is generated by the configuration device according to at least the role type of the second device and a private key for signature of the configuration device, and the public key for signature of the configuration device corresponds to the private key for signature of the configuration device; and
generate a key for establishing a secured connection between the first device and the second device when conditions are met, wherein the conditions comprise: a role type of the first device matches the role type of the second device, and a verification of the second signature is successful;

wherein the role type of the first device matches the role type of the second device when any one of the following is met:

the role type of the second device is an access point, and the role type of the first device is a station;

the role type of the second device is a station, and the role type of the first device is an access point;

the role type of the second device is a Peer to Peer (P2P) client, and the role type of the first device is a P2P group owner; or the role type of the second device is a P2P group owner, and the role type of the first device is a P2P client.

18. The non-transitory computer-readable medium according to claim 17, wherein the conditions further comprise:
a net-id received from the second device is the same as a net-id of the first device.

19. The non-transitory computer-readable medium according to claim 17, wherein the verification of the second signature is successful comprises:
the second signature matches the role type of the second device.

20. The non-transitory computer-readable medium according to claim 19, wherein the second signature matches the role type of the second device comprises:
a first hash value is equal to a second hash value,
wherein the first hash value is a hash value generated by the configuration device by performing a hash operation on at least the role type of the second device and is obtained by the first device by decrypting the second signature by using the public key for signature of the configuration device, and the second hash value is generated by the first device by performing the hash operation on at least the role type of the second device.

* * * * *